United States Patent
Schaefer et al.

(10) Patent No.: US 9,425,577 B2
(45) Date of Patent: Aug. 23, 2016

(54) OPTICAL FIBER AND LASER OSCILLATOR USING SAME

(71) Applicant: Mitsuboshi Diamond Industrial Co., LTD., Settsu, Osaka (JP)

(72) Inventors: Christian Schaefer, Settsu (JP); Masanao Murakami, Settsu (JP)

(73) Assignee: Mitsuboshi Diamond Industrial Co., LTD., Osaka (JP)

( * ) Notice: Subject to any disclaimer, the term of this patent is extended or adjusted under 35 U.S.C. 154(b) by 0 days.

(21) Appl. No.: 14/774,135

(22) PCT Filed: Mar. 20, 2014

(86) PCT No.: PCT/JP2014/057806
§ 371 (c)(1),
(2) Date: Sep. 10, 2015

(87) PCT Pub. No.: WO2014/156972
PCT Pub. Date: Oct. 2, 2014

(65) Prior Publication Data
US 2016/0043523 A1    Feb. 11, 2016

(30) Foreign Application Priority Data
Mar. 28, 2013 (JP) ................... 2013-067938

(51) Int. Cl.
*H01S 3/042* (2006.01)
*H01S 3/067* (2006.01)
(Continued)

(52) U.S. Cl.
CPC ............. *H01S 3/042* (2013.01); *H01S 3/06704* (2013.01); *H01S 3/06708* (2013.01);
(Continued)

(58) Field of Classification Search
CPC . H01S 3/042; H01S 3/06704; H01S 3/06716; H01S 3/06754; H01S 3/091; H01S 3/1608; H01S 3/173
See application file for complete search history.

(56) References Cited

U.S. PATENT DOCUMENTS 6,137,813 A * 10/2000 Ionov ................. H01S 3/067
372/18
6,347,100 B1 * 2/2002 Sanders ............. H01S 3/067
372/32
(Continued)

FOREIGN PATENT DOCUMENTS

EP    2323230 A1    5/2011
JP    S62-266504 A    11/1987
(Continued)

OTHER PUBLICATIONS

The Search Report from the corresponding International Patent Application No. PCT/JP2014/057806 issued on May 27, 2014.
(Continued)

Primary Examiner — Xinning Niu
(74) Attorney, Agent, or Firm — Shinjyu Global IP

(57) ABSTRACT

An optical fiber includes a first optical fiber body, a second optical fiber body and a first end cap. The first optical fiber body includes a first core and a first cladding. The second optical fiber body includes a second core and a second cladding, and is joined at a first end surface thereof to a first end surface of the first optical fiber body. The first end cap has light permeability and is joined to a second end surface of the second optical fiber body. The first core is doped with a laser medium. A mass content of the laser medium in the second core is lower than that of the laser medium in the first core.

9 Claims, 3 Drawing Sheets

(51) Int. Cl.
*H01S 3/091* (2006.01)
*H01S 3/16* (2006.01)
*H01S 3/17* (2006.01)
*H01S 3/00* (2006.01)
*H01S 3/04* (2006.01)

(52) U.S. Cl.
CPC ............ *H01S3/06754* (2013.01); *H01S 3/091* (2013.01); *H01S 3/005* (2013.01); *H01S 3/0071* (2013.01); *H01S 3/0405* (2013.01); *H01S 3/0407* (2013.01); *H01S 3/06716* (2013.01); *H01S 3/06745* (2013.01); *H01S 3/1608* (2013.01); *H01S 3/173* (2013.01)

(56) References Cited

U.S. PATENT DOCUMENTS

| | | |
|---|---|---|
| 2005/0244101 A1 | 11/2005 | Kitabayashi et al. |
| 2006/0280208 A1* | 12/2006 | Baev ..................... H01S 3/067 372/6 |
| 2007/0230517 A1 | 10/2007 | Matsuda et al. |
| 2008/0037604 A1 | 2/2008 | Savage-Leuchs |
| 2010/0110535 A1* | 5/2010 | Murison ................. H01S 3/067 359/341.3 |
| 2010/0188735 A1 | 7/2010 | Tamaoki |
| 2012/0307251 A1* | 12/2012 | Sanders ............... G01C 19/727 356/460 |
| 2013/0028274 A1 | 1/2013 | Samartsev et al. |
| 2013/0243377 A1* | 9/2013 | Seo ...................... G02B 6/2821 385/37 |

FOREIGN PATENT DOCUMENTS

| | | |
|---|---|---|
| JP | 2001-274489 A | 10/2001 |
| JP | 2005-303166 A | 10/2005 |
| JP | 2007-273842 A | 10/2007 |

OTHER PUBLICATIONS

European Search Report from the corresponding European Patent Application No. 14775306.5 issued on Apr. 12, 2016.

* cited by examiner

OPTICAL FIBER AND LASER OSCILLATOR USING SAME

PRIORITY

This is a National Stage Application under 35 U.S.C. §365 of International Application PCT/JP2014/057806, with an international filing date of Mar. 20, 2014, which claims priority to Japanese Patent Application No. 2013-067938 filed on Mar. 28, 2013. The entire disclosures of International Application PCT/JP2014/057806 and Japanese Patent Application No. 2013-067938 are hereby incorporated herein by reference.

TECHNICAL FIELD

Certain implementations of the present invention relate to an optical fiber and a laser oscillator using the same.

BACKGROUND

Laser oscillators utilizing an optical fiber have been widely used. This type of laser oscillator is configured to oscillate a laser light by the optical fiber with use of an excitation light to be oscillated from a light source. The optical fiber to be used for this type of laser oscillator is made of, for instance, fluoride glass such as ZBLAN glass doped with a laser medium such as erbium. However, there is a drawback that fluoride glass as described above, particularly ZBLAN glass, deliquesces by moisture contained in the atmosphere by which the laser light from the optical fiber is absorbed. Put differently, there is a drawback that an end surface of the optical fiber is damaged.

For instance, an end cap is joined to the end surface of the optical fiber in order to solve the drawback. With the construction, the end surface of the optical fiber is not exposed to the atmosphere. Hence, the end surface of the optical fiber can be prevented from deliquescing by the moisture contained in the atmosphere.

The laser medium contained in the optical fiber generates heat by absorbing the excitation light. Hence, it is required to prevent that the optical fiber is burnt and damaged by the heat generation. For instance, the optical fiber is interposed and held between two metallic plates and heat from the optical fiber is transferred thereto. Thus, damage of the optical fiber attributed to heat generation is prevented.

SUMMARY OF INVENTION

In interposing and holding the optical fiber between the two metallic plates as described above, it is difficult to completely interpose and hold the optical fiber inclusive of its both ends between the metallic plates. Hence, chances are that the both ends of the optical fiber are exposed from the metallic plates. In this case, a drawback is caused that the optical fiber generates heat and is damaged at its first end on which the excitation light is incident.

It is an object of certain implementations of the present invention to inhibit damage of an end of an optical fiber.

(1) An optical fiber according to a first aspect of the present invention is an optical fiber for generating or amplifying a laser light with use of an excitation light. The optical fiber includes a first optical fiber body, a second optical fiber body and a first end cap. The first optical fiber body includes a first core and a first cladding. The second optical fiber body includes a second core and a second cladding, and is joined at a first end surface thereof to a first end surface of the first optical fiber body. The first end cap has light permeability and is joined to a second end surface of the second optical fiber body. The first core is doped with a laser medium. A mass content of the laser medium in the second core is lower than a mass content of the laser medium in the first core.

According to the present construction, firstly, the second optical fiber body is joined to the first end surface of the first optical fiber body, and thus, the first end surface is not exposed to the atmosphere. The first end surface can be thereby prevented from deliquescing by moisture contained in the atmosphere in which an output light is absorbed. Additionally, the first end cap is joined to the second end surface of the second optical fiber body, and the second end surface is not exposed to the atmosphere. Hence, deliquescence of the second end surface can be similarly prevented.

Moreover, the second optical fiber body is joined to the first end surface of the first optical fiber body. Hence, when the first optical fiber body is, for instance, interposed and held between cooling members such as metallic plates, the first end of the first optical fiber body is prevented from being exposed from the cooling members. As a result, the first optical fiber body inclusive of its first end can be sufficiently cooled, and thereby, damage of the first core by generation of heat can be prevented. It should be noted that the second optical fiber body has a possibility of being partially exposed from the cooling members. However, the mass content of the laser medium in the second core of the second optical fiber body is set to be lower than that of the laser medium in the first core of the first optical fiber body, and hence, the absorbance of the excitation light by the second core is lower than that of the excitation light by the first core. Accordingly, generation of heat by the second core can be inhibited, and hence, damage of the second core by generation of heat can be inhibited. It should be noted that the first end of the first optical fiber body means an end to which the second optical fiber body is connected. Additionally, the present optical fiber is preferably used such that the excitation light is incident thereon from the first end cap side.

(2) It is preferable that the first core is doped with the laser medium, and the second core is not doped with the laser medium. According to the present construction, the second core is not doped with any laser medium, and hence, generation of heat attributed to absorption of an excitation light is prevented. As a result, even when the second optical fiber body is partially exposed from cooling members, damage of the second core can be prevented.

(3) It is preferable that the first and second optical fiber bodies are made of fluoride glass, and the laser medium is a rare earth element. Specifically, it is preferable that the first and second optical fiber bodies are made of ZBLAN glass, and the laser medium is erbium.

According to the present construction, luminescence characteristics and so forth can be enhanced. Additionally, fluoride glass, especially ZBLAN glass, has deliquescence, and hence, applying certain implementations of the present invention to the optical fiber is particularly effective.

(4) It is preferable that the first end cap is made of calcium fluoride.

(5) It is preferable that the second core has a diameter larger than a diameter of the first core, and is designed to have a length whereby reflection of an output light from the first core is prevented within the second core. According to the present construction, an output light can be outputted from the first core without changing the mode of the output light.

(6) It is preferable that the optical fiber further includes a second end cap that has light permeability and is joined to a second end surface of the first optical fiber body. According to the present construction, damage of the second end surface of the first optical fiber body can be also prevented.

(7) It is preferable that the optical fiber further includes a cooling member for cooling the first optical fiber body and the second optical fiber body. According to the present construction, damage of the first core of the first optical fiber body by generation of heat can be prevented.

(8) A laser oscillator according to a second aspect of the present invention includes the optical fiber having any of the aforementioned constructions, a chassis accommodating the optical fiber, and a light source configured to oscillate the excitation light.

According to certain implementations of the present invention, damage of an end of an optical fiber can be inhibited.

DETAILED DESCRIPTION

Figure 1:
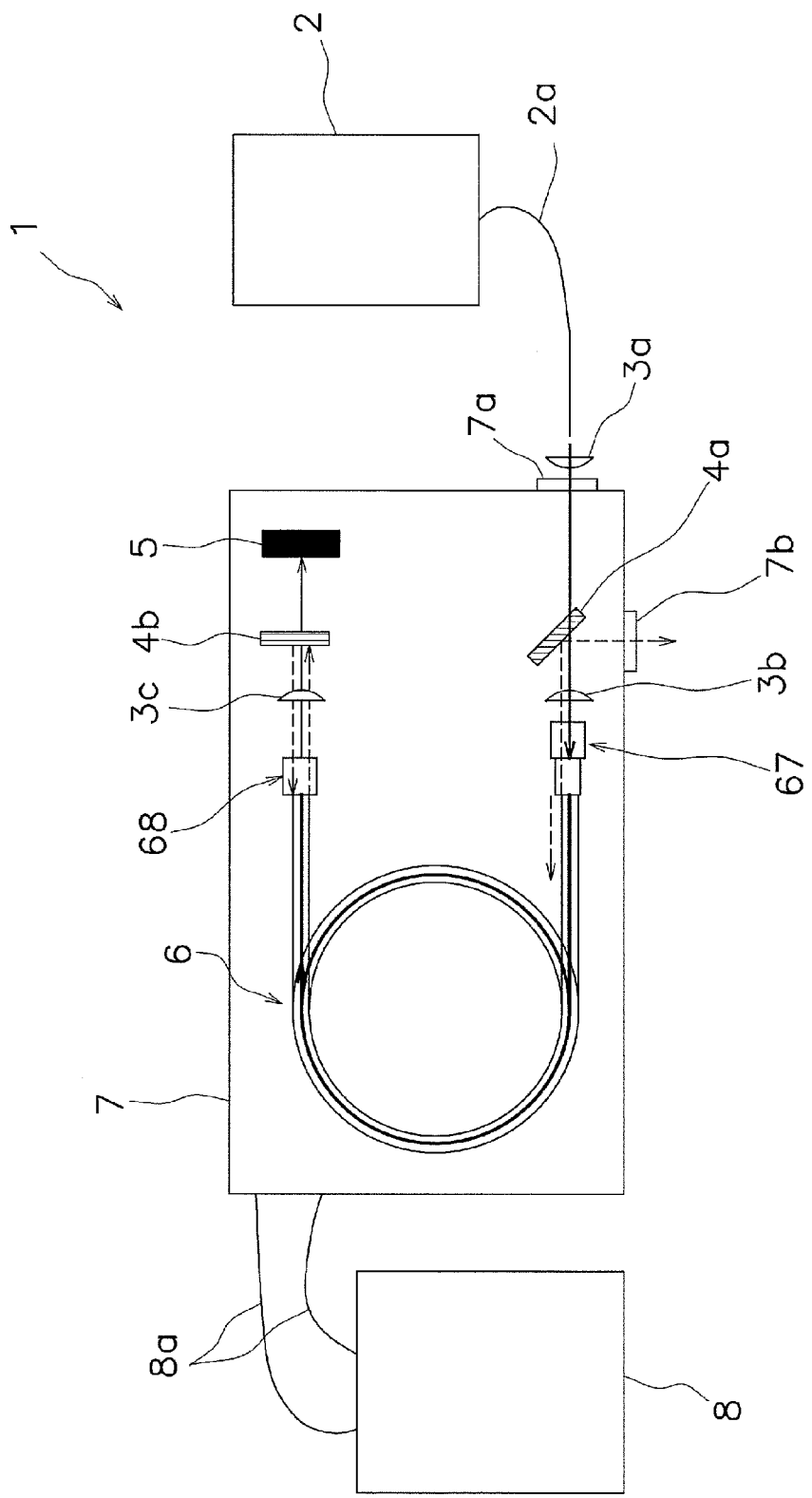
FIG. 1 is a schematic diagram showing a construction of a laser oscillator.

An exemplary embodiment of an optical fiber and a laser oscillator using the same according to certain implementations of the present invention will be hereinafter explained with reference to drawings. FIG. 1 is a schematic diagram of a construction of the laser oscillator.

As shown in FIG. 1, a laser oscillator 1 includes a light source 2, first to third lenses 3a, 3b and 3c, first and second dichroic mirrors 4a and 4b, a damper 5, an optical fiber 6, a chassis 7 and a chiller 8.

The light source 2 is configured to oscillate an excitation light, and can be composed of, for instance, a lamp, a semiconductor laser or so forth. The excitation light oscillated in the light source 2 is outputted through an excitation light transmission fiber 2a.

The first lens 3a is a lens functioning as a collimator lens, and is disposed between the excitation light transmission fiber 2a and a first window part 7a of the chassis 7 to be described. The first lens 3a is configured to convert the excitation light, transmitted thereto from the light source 2, into a state of collimated light from a state of divergent light.

The second lens 3b is a lens functioning as a condenser lens and a collimator lens, and is disposed between the first dichroic mirror 4a and a first end 67 of the optical fiber 6. The second lens 3b is configured to condense the excitation light converted into the state of collimated light by the first lens 3a and irradiate the condensed light to the optical fiber 6, and is also configured to convert the laser light irradiated from the optical fiber 6 into the state of collimated light.

The third lens 3c is a lens functioning as a condenser lens and a collimator lens, and is disposed between the second dichroic mirror 4b and a second end 68 of the optical fiber 6. The third lens 3c is configured to convert the excitation light and the laser light from the optical fiber 6 into the state of collimated light, and is also configured to condense the laser light from the second dichroic mirror 4b and irradiate the condensed light to the optical fiber 6.

The first dichroic mirror 4a is disposed between the first lens 3a and the second lens 3b. The first dichroic mirror 4a is designed to allow passage of the excitation light from the light source 2 and reflect the laser light from the optical fiber 6 so as to change its transmission direction.

The second dichroic mirror 4b is disposed between the third lens 3c and the damper 5. The second dichroic mirror 4b is designed to allow passage of the excitation light from the optical fiber 6 and reflect the laser light from the optical fiber 6.

The damper 5 is a member disposed downstream of the second dichroic mirror 4b so as to absorb the excitation light that has passed through the second dichroic mirror 4b.

Figure 2:
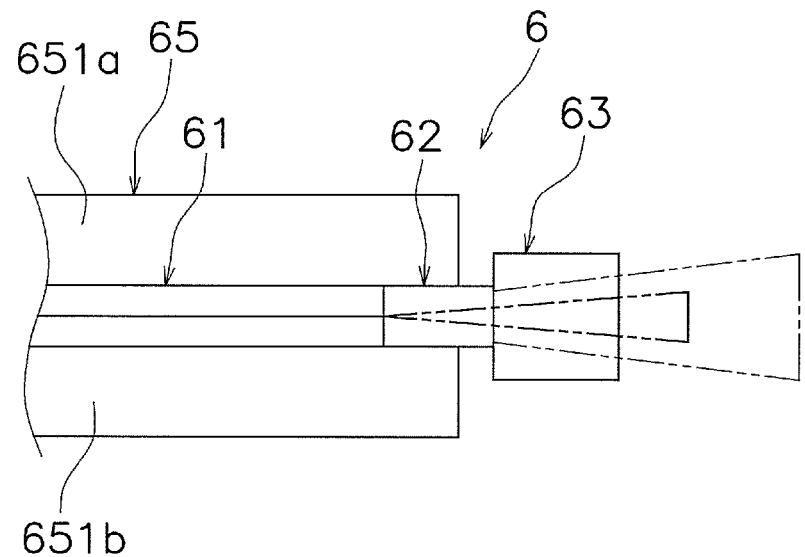
FIG. 2 is a cross-sectional view of a front end side part of an optical fiber.
Figure 3:
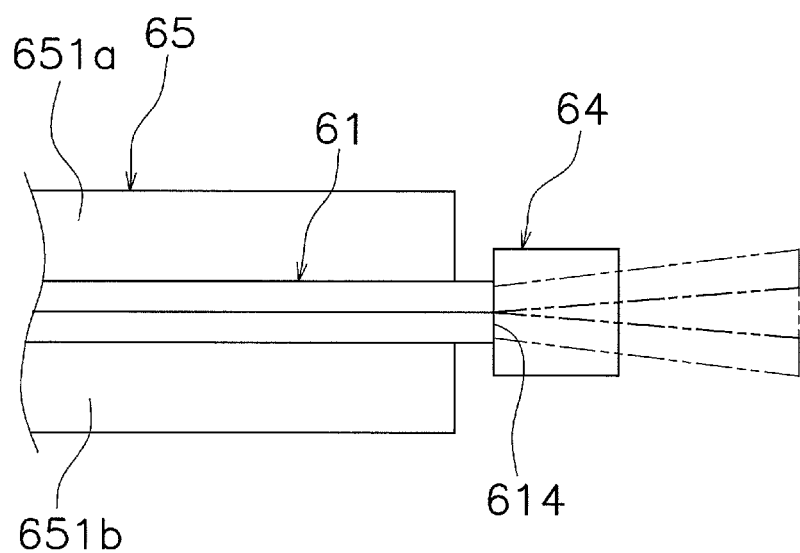
FIG. 3 is a cross-sectional view of a second end side part of the optical fiber.

FIG. 2 is a cross-sectional side view of a first end 67 side part of the optical fiber 6, whereas FIG. 3 is a cross-sectional side view of a second end 68 side part of the optical fiber 6. As shown in FIGS. 2 and 3, the optical fiber 6 includes a first optical fiber body 61, a second optical fiber body 62, a first end cap 63, a second end cap 64 and a cooling member 65.

Figure 4:
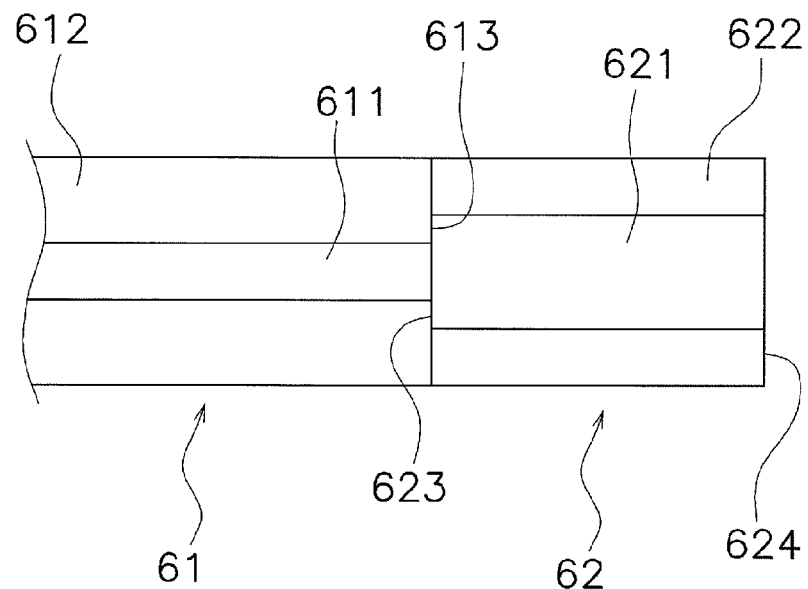
FIG. 4 is a detailed cross-sectional view of first and second optical fiber bodies on the first end side of the optical fiber.

The first optical fiber body 61 is a main portion of the optical fiber 6 and a laser light is produced in the first optical fiber body 61. FIG. 4 is a cross-sectional side view of a detailed construction of the first optical fiber body 61 and the second optical fiber body 62 on the first end 67 side of the optical fiber 6. As shown in FIG. 4, the first optical fiber body 61 has a first core 611 and a first cladding 612 formed so as to enclose the first core 611.

The first core 611 is made of fluoride glass doped with a rare earth element as a laser medium, and is preferably made of ZBLAN ($ZrF_4$—$BaF_2$—$LaF_3$—$AlF_3$—$NaF$) glass doped with erbium. The first cladding 612 is made of fluoride glass, and is preferably made of ZBLAN glass. It should be noted that the first cladding 612 has a refractive index lower than that of the first core 611 and is not doped with any laser medium.

A first end surface 623 of the second optical fiber body 62 is joined to a first end surface 613 of the first optical fiber body 61. The second optical fiber body 62 has a second core 621 and a second cladding 622 formed so as to enclose the second core 621. The second optical fiber body 62 extends coaxially to the first optical fiber body 61, and has a diameter roughly equal to that of the first optical fiber body 61. Put differently, the second cladding 622 has an outer diameter roughly equal to that of the first cladding 612. It should be noted that the second optical fiber body 62 is joined to the first optical fiber body 61 by thermal fusion boding.

The second core 621 of the second optical fiber body 62 has a diameter larger than that of the first core 611 of the first optical fiber body 61. Additionally, the second optical fiber body 62 is designed to have a length whereby reflection of a laser light from the first optical fiber body 61 is prevented within the second core 621. Put differently, when entering the second core 621 from the first core 611, the laser light is irradiated from the second core 621 before being reflected within the second core 621. Moreover, the second core 621 is not doped with any rare earth element such as erbium as a laser medium, and thus, does not generate heat even when an excitation light is incident thereon. Put differently, no laser light is produced in the second optical fiber body 62.

As shown in FIG. 2, the first end cap 63 is joined to a second end surface 624 of the second optical fiber body 62. Specifically, the first end cap 63 is joined to the second optical fiber body 62 by thermal fusion bonding. The first end cap 63 has light permeability of allowing an excitation light and a laser light to pass therethrough, and does not have deliquescence. Additionally, the first end cap 63 preferably has a melting point higher than or equal to that of the second optical fiber body 62, and preferably has a thermal conductivity higher than that of the second optical fiber body 62 so as to cool the second end surface 624 of the second optical fiber body 62. Moreover, the first end cap 63 preferably has a coefficient of linear expansion equivalent to that of the second optical fiber body 62 so as to be tightly joined to the second optical fiber body 62. Specifically, the first end cap 63 can be a crystal of calcium fluoride or so forth. Alternatively, the first end cap 63 may be a crystal of quartz or so forth.

As shown in FIG. 3, the second end cap 64 is joined to a second end surface 614 of the first optical fiber body 61. Specifically, the second end cap 64 is joined to the first optical fiber body 61 by thermal fusion bonding. The second end cap 64 has the same construction as the aforementioned first end cap 63, and therefore, the detailed explanation thereof will not be described.

As shown in FIGS. 2 and 3, the cooling member 65 is composed of two metallic plates 651*a* and 651*b*. The metallic plates 651*a* and 651*b* are made of, for instance, copper. The cooling member 65 is constructed to hold the first and second optical fiber bodies 61 and 62 such that the first and second optical fiber bodies 61 and 62 are interposed between the two metallic plates 651*a* and 651*b*. It should be noted that the first optical fiber body 61 is entirely interposed in and held by the cooling member 65. Put differently, the first optical fiber body 61 is not exposed from the respective metallic plates 651*a* and 651*b* in its lengthwise direction.

When described in more detail, the metallic plates 651*a* and 651*b* respectively have recesses on their opposed surfaces in order to hold the first and second optical fiber bodies 61 and 62. The first and second optical fiber bodies 61 and 62 are accommodated in an accommodation part delimited by the respective recesses, and are contacted to the respective metallic plates 651*a* and 651*b* within the accommodation part. With the construction, when heat is generated in the first and second optical fiber bodies 61 and 62, the generated heat is released through the metallic plates 651*a* and 651*b*. It should be noted that the respective metallic plates 651*a* and 651*b* are contacted to each other at other parts except for the recesses. The metallic plate 651*b*, disposed as the bottom side one of the metallic plates, is contacted to a base part of the chassis 7 to be described.

As shown in FIG. 1, the chassis 7 is a cubical box member and accommodates the second and third lenses 3*b* and 3*c*, the first and second dichroic mirrors 4*a* and 4*b*, the damper 5 and the optical fiber 6. The chassis 7 has the first window part 7*a* and a second window part 7*b*, both of which have light permeability. The excitation light from the light source 2 is transmitted into the chassis 7 through the first window part 7*a* and is fed to the optical fiber 6. On the other hand, the laser light from the optical fiber 6 is outputted to the outside of the chassis 7 through the second window part 7*b*.

Additionally, the chassis 7 has the base part (not shown in the drawing) on its bottom side. A flow path in which refrigerant flows is formed in the interior of the base part. The aforementioned metallic plate 651*b* is mounted onto the base part, and is thereby cooled. Additionally, the metallic plate 651*a* is contacted to the metallic plate 651*b*, and is thus cooled by heat transference therebetween.

The interior of the chassis 7 is filled with nitrogen. Additionally, a desiccant is put in the interior of the chassis 7 in order to remove moisture in the interior of the chassis 7.

The chiller 8 is connected to the chassis 7 through pipes 8*a*. The chiller 8 is configured to regulate the temperature of the refrigerant flowing within the base part of the chassis 7. Specifically, the chiller 8 is configured to cool the refrigerant fed from the base part of the chassis 7 through one pipe 8*a*. The refrigerant cooled by the chiller 8 is returned to the base part of the chassis 7 through the other pipe 8*a*.

Next, an action of the laser oscillator 1 constructed as described above will be explained.

An excitation light oscillated by the light source 2 is outputted from the excitation light transmission fiber 2*a*, is converted into the state of parallel light by the first lens 3*a*, and is transmitted into the chassis 7 through the first window part 7*a*. The excitation light transmitted into the chassis 7 penetrates through the first dichroic mirror 4*a*, is condensed by the second lens 3*b*, and enters the optical fiber 6 from its first end 67. When described in more detail, the excitation light enters the optical fiber 6 from its first end cap 63.

After entering the optical fiber 6, the excitation light propagates through the first core 611 of the first optical fiber body 61. Erbium doped in the first core 611 is thereby excited and outputs a laser light. It should be noted that the excitation light also propagates through the second core 621 of the second optical fiber body 62, but a laser light is not outputted in the second core 621 because the second core 621 is not doped with erbium. The excitation light is gradually reduced in intensity during propagation through the first core 611. Then, the excitation light, irradiated from the second end 68 of the optical fiber 6, penetrates through the third lens 3*c* and the second dichroic mirror 4*b* and is absorbed by the damper 5.

On the other hand, the laser light generated in the first core 611 of the first optical fiber body 61 is irradiated from the second end 68 of the optical fiber 6, and is converted into the state of parallel light by the third lens 3*c*. Then, the laser light is reflected by the second dichroic mirror 4*b*, is condensed by the third lens 3*c*, and enters the optical fiber 6 from the second end 68 side. After entering the optical fiber 6, the laser light propagates through the first core 611 of the first optical fiber body 61, and is irradiated from the first end 67 of the optical fiber 6. Then, the laser light is converted into the state of parallel light by the second lens 3*b*, is reflected by the first dichroic mirror 4*a*, is changed in propagation direction so as to be directed to the second window part 7*b*, and is irradiated to the outside of the chassis 7 through the second window part 7*b*.

Features

The optical fiber 6 according to the present exemplary embodiment has the following features.

(1) First, the second optical fiber body 62 is joined to the first end surface 613 of the first optical fiber body 61, and the first end surface 613 is not exposed to the atmosphere. Hence, the first end surface 613 can be prevented from deliquescing by moisture contained in the atmosphere in which an output light is absorbed. Additionally, the first end cap 63 is joined to the second end surface 624 of the second optical fiber body 62, and the second end surface 624 is not exposed to the atmosphere. Hence, deliquescence of the second end surface 624 can be similarly prevented.

Moreover, the second optical fiber body 62 is joined to the first end surface 613 of the first optical fiber body 61. Hence, when the first optical fiber body 61 is interposed and held between the metallic plates 651*a* and 651*b*, the first end 67 of the first optical fiber body 61 is prevented from being exposed from the metallic plates 651*a* and 651*b*. As a result, the first end 67 of the first optical fiber body 61 can be also sufficiently cooled, and thereby, damage of the first core 611 by generation of heat can be prevented. It should be noted that the second optical fiber body 62 has a possibility of being exposed from the metallic plates 651*a* and 651*b*. However, the second core 621 is not doped with any laser medium, and thus, the second core 621 can be prevented from generating heat by absorption of an excitation light. As a result, even when the second optical fiber body 62 is exposed from the metallic plates 651a and 651b, damage of the second core 621 can be prevented.

(2) The second core 621 has a diameter larger than that of the first core 611 and is designed to have a length whereby reflection of an output light from the first core 611 is prevented within the second core 621. Therefore, a laser light generated by the first core 621 can be outputted without changing the mode of the laser light.

(3) The second end cap 64 is joined to the second end surface 614 of the first optical fiber body 61, and hence, damage of the second end surface 614 of the first optical fiber body 61 can be also prevented.

Modifications

Certain implementations of the present invention have been explained above. However, the present invention is not limited to the aforementioned exemplary embodiment, and a variety of changes can be herein made without departing from the scope of the present invention.

Modification 1

Figure 5:
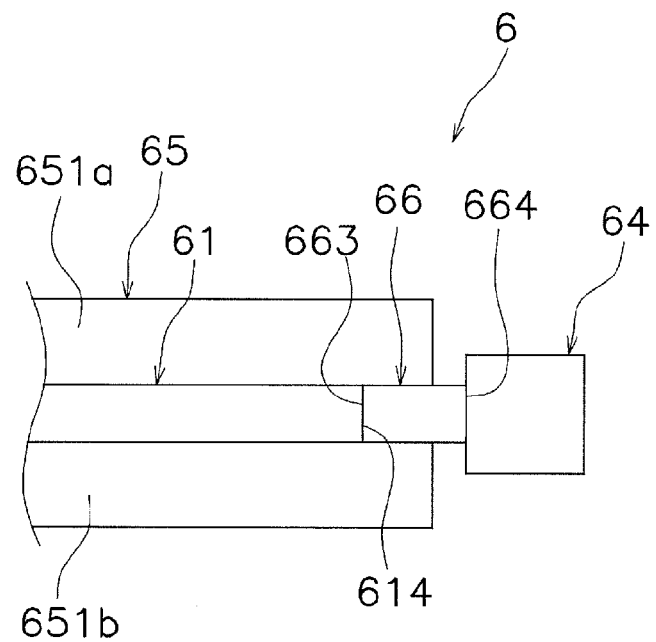
FIG. 5 is a cross-sectional view of a second end side part of an optical fiber according to Modification 1.

In the aforementioned exemplary embodiment, the second end cap 64 is joined to the second end surface 614 of the first optical fiber body 61, but the construction composed of these elements is not particularly limited to this. For example, as shown in FIG. 5, a third optical fiber body 66 may be interposed between the first optical fiber body 61 and the second end cap 64. Specifically, the third optical fiber body 66 is joined at a first end surface 663 to the second end surface 614 of the first optical fiber body 61, and is joined at a second end surface 664 to the second end cap 64. The third optical fiber body 66 can have the same construction as the second optical fiber body 62.

Modification 2

In the aforementioned exemplary embodiment, the second core 621 of the second optical fiber body 62 does not contain any laser medium, but its configuration regarding containment of a laser medium is not limited to this. For example, the second core 621 of the second optical fiber body 62 may contain a laser medium with a mass content lower than that of the laser medium contained in the first core 611 of the first optical fiber body 61. It should be noted that the mass content of the laser medium contained in the second core 621 depends on the intensity of an excitation light, the sort of a laser medium and so forth, but is preferably set such that the second core 621 is not damaged by generation of heat.

Modification 3

In the aforementioned exemplary embodiment, the first optical fiber body 61 is designed to include the first core 611 and the first cladding 612 formed so as to enclose the first core 611, but its construction is not limited to this. For example, the first optical fiber body 61 can be formed as a so-called double cladding fiber. Specifically, the first cladding 612 may be composed of an inner cladding and an outer cladding enclosing the inner cladding.

The invention claimed is:

1. An optical fiber for generating or amplifying a laser light through use of an excitation light, comprising:
    a first optical fiber body including a first core and a first cladding;
    a second optical fiber body including a second core and a second cladding and joined at a first end surface thereof to a first end surface of the first optical fiber body; and
    a first end cap having light permeability and joined to a second end surface of the second optical fiber body, wherein
    the first core is doped with a laser medium,
    a mass content of the laser medium in the second core is lower than a mass content of the laser medium in the first core; and
    wherein the second core has a diameter larger than a diameter of the first core and is designed to have a length whereby reflection of an output light from the first core is prevented within the second core.

2. The optical fiber recited in claim 1, wherein
    the first core is doped with the laser medium, and
    the second core is not doped with the laser medium.

3. The optical fiber recited in claim 1, wherein
    the first and second optical fiber bodies are made of fluoride glass, and
    the laser medium is a rare earth element.

4. The optical fiber recited in claim 3, wherein the first and second optical fiber bodies are made of ZBLAN glass.

5. The optical fiber recited in claim 3, wherein the laser medium is erbium.

6. The optical fiber recited in claim 1, wherein the first end cap is made of calcium fluoride.

7. The optical fiber recited in claim 1, further comprising:
    a second end cap having light permeability and joined to a second end surface of the first optical fiber body.

8. The optical fiber recited in claim 1, further comprising:
    a cooling member for cooling the first optical fiber body and the second optical fiber body.

9. A laser oscillator, comprising:
    the optical fiber recited in claim 1;
    a chassis accommodating the optical fiber; and
    a light source configured to oscillate the excitation light.

* * * * *